(12) United States Patent
Lenz et al.

(10) Patent No.: US 10,814,599 B2
(45) Date of Patent: Oct. 27, 2020

(54) LAMINATING APPARATUS AND METHOD FOR PRODUCING A LAMINATE

(71) Applicant: NICE SOLAR ENERGY GMBH, Schwaebisch Hall (DE)

(72) Inventors: Daniel Lenz, Kolkwitz (DE); Martin Haselbauer, Leipzig (DE); Volker Strickert, Leipzig (DE)

(73) Assignee: Nice Solar Energy GmbH, Schwaebisch Hall (DE)

( * ) Notice: Subject to any disclaimer, the term of this patent is extended or adjusted under 35 U.S.C. 154(b) by 241 days.

(21) Appl. No.: 15/123,741

(22) PCT Filed: Mar. 5, 2015

(86) PCT No.: PCT/EP2015/054597
§ 371 (c)(1),
(2) Date: Sep. 6, 2016

(87) PCT Pub. No.: WO2015/132334
PCT Pub. Date: Sep. 11, 2015

(65) Prior Publication Data
US 2017/0015089 A1    Jan. 19, 2017

(30) Foreign Application Priority Data

Mar. 6, 2014    (DE) .......................... 10 2014 204 125

(51) Int. Cl.
*B32B 37/10*    (2006.01)
*B32B 37/00*    (2006.01)
(Continued)

(52) U.S. Cl.
CPC .......... *B32B 37/10* (2013.01); *B32B 37/0046* (2013.01); *B32B 37/1018* (2013.01);
(Continued)

(58) Field of Classification Search
CPC ... B32B 2037/264; B32B 37/10; B32B 37/14; B32B 37/26; B30B 5/02; B30B 9/22; B29C 2043/3644; B29C 51/28
(Continued)

(56) References Cited

U.S. PATENT DOCUMENTS 4,078,962 A * 3/1978 Krueger .................... B30B 5/02
100/211
6,197,146 B1    3/2001 Sucic et al.
(Continued)

FOREIGN PATENT DOCUMENTS

AT    506120 A1 * 6/2009 ............... B30B 5/02
AT    506120 A1    6/2009
(Continued)

OTHER PUBLICATIONS

Derwent Abstract for AT506120, Jun. 2009.*
Machine translation of AT506120B, Jan. 2010.*

*Primary Examiner* — Philip C Tucker
*Assistant Examiner* — Jimmy R Smith, Jr.
(74) *Attorney, Agent, or Firm* — Laurence A. Greenberg; Werner H. Stemer; Ralph E. Locher

(57) ABSTRACT

A laminating device and a method for producing a laminate. The laminating device has at least one membrane element. The laminating device has at least one force distributing element, wherein a laminating force which can be transmitted onto a lamination object by the membrane element can be distributed onto at least one sub region of a membrane-side surface of the lamination object via the at least one force distributing element. The at least one force distributing element is held on the laminating device.

9 Claims, 4 Drawing Sheets

(51) Int. Cl.
*B32B 37/14* (2006.01)
*B32B 37/26* (2006.01)
*B30B 5/02* (2006.01)

(52) U.S. Cl.
CPC ............. *B32B 37/14* (2013.01); *B30B 5/02* (2013.01); *B32B 2037/264* (2013.01); *B32B 2309/02* (2013.01); *B32B 2309/12* (2013.01); *B32B 2457/12* (2013.01)

(58) Field of Classification Search
USPC ............... 156/580, 581, 540, 552, 556, 563
See application file for complete search history.

(56) References Cited

U.S. PATENT DOCUMENTS

| | | | |
|---|---|---|---|
| 2004/0076482 A1* | 4/2004 | Singleton | ............... E02D 17/20 405/302.6 |
| 2009/0056855 A1 | 3/2009 | Stevens | |
| 2010/0126672 A1 | 5/2010 | Meisser et al. | |
| 2010/0288442 A1* | 11/2010 | Damm | .................... B30B 5/02 156/382 |
| 2012/0103397 A1 | 5/2012 | Damm | |
| 2012/0129292 A1 | 5/2012 | Safir | |

FOREIGN PATENT DOCUMENTS

| | | |
|---|---|---|
| CN | 102364693 A | 2/2012 |
| DE | 202013000917 U1 | 2/2013 |
| EP | 2239789 A1 | 10/2010 |
| FR | 2928861 A1 | 9/2009 |
| JP | H04113926 U | 10/1992 |
| JP | H10212805 A | 8/1998 |
| JP | H11186575 A | 7/1999 |
| JP | 2001188892 A | 7/2001 |
| JP | 2001284625 A | 10/2001 |
| JP | 2010245375 A | 10/2010 |
| JP | 2010245391 A | 10/2010 |

* cited by examiner

# LAMINATING APPARATUS AND METHOD FOR PRODUCING A LAMINATE

BACKGROUND OF THE INVENTION

Field of the Invention

The invention relates to a laminating apparatus, especially for the production of a photovoltaic module, and a method for producing a laminate, especially a photovoltaic module.

Methods for the production of photovoltaic modules, in which a lamination step is implemented, are known from the prior art. For instance, the US patent 2012/103397 A describes a method for producing an edge sealing for a photovoltaic module. This patent describes as problem that during a lamination process an upper glass panel, especially in corner and edge areas, may warp due to an elasticity of a membrane of a membrane press. If the upper glass panel returns in such a case to its original state after lamination, partial cracks may occur in the sealing material of the glass panel and thus result in bubbles in the corner and edge areas, especially in a sealing material placed in these areas. That can be described as delamination. The patent suggests as solution arranging a laminating body with a core between a glass cover and a back glass, which frames the edges.

JP 2010245375 A discloses another solution. The patent suggests a press plate, which covers the entire upper surface of a protective element of a photovoltaic module, wherein a laminate is pressurized by way of the press plate and heated. The patent describes the press plate, however, as a component, which must by applied to the body to be laminated prior to a lamination process in an additional step. In particular, the patent does not disclose any holder of the lamination body.

The technical problem involves creating a laminating apparatus and a method for the production of a laminate, especially a photovoltaic module produced by lamination, which allow a production of the laminate of a higher quality, in particular a production with a reduced number of bubbles embedded in the laminate.

The solution to the technical problem is solved by the objects as claimed. Other advantageous embodiments result from the dependent claims.

BRIEF SUMMARY OF THE INVENTION

It is a basic idea of the invention to place a force distributing element between a membrane of a laminating apparatus and a membrane-side surface of a lamination object such that forces, which are exerted by the membrane in particular on an edge area of a membrane-side surface of the lamination object, are distributed to a portion of the surface, wherein the force distributing element is mounted to the laminating apparatus.

A laminating apparatus is proposed, where the laminating apparatus includes at least one membrane element. Using a laminating apparatus, a desired pressure and/or temperature can be provided in a known manner and can affect on a lamination object, in other words an object to be laminated. The laminating apparatus can exhibit a lamination chamber. The lamination chamber can designate or include a volume range, in which the lamination object is to be placed for the lamination. The lamination chamber in this context can be at least partially surrounded by the membrane element, e.g. be formed between a surface area of the laminating apparatus and the membrane element.

Furthermore, the laminating apparatus comprises at least one force distributing element. The at least one force distributing element can be arranged between the at least one membrane element and the surface area of the lamination chamber. By means of the at least one force distributing element, a lamination force, which can be transferred or exerted by the membrane element to a lamination object, is distributable to at least one portion of a membrane-side surface of the lamination object. For instance, the at least one force distributing element can be formed and/or arranged in or on the laminating apparatus that the lamination force is distributable by the at least one force distributing element to the at least one portion of the membrane-side surface of the lamination object.

The lamination object can be arrange able or arranged in this context in the lamination chamber. By lamination, in particular by generating a preset pressure and/or a preset temperature and applying such to the lamination object, a laminate can be produced from the lamination object.

It is possible that the lamination object is a laminated safety glass composite, wherein a lamination of the laminated safety glass composite can produce a laminated safety glass.

In particular, the lamination object may be a module composite, wherein a photovoltaic module is manufactured by laminating the module composite. The module composite can in particular comprise a first cover element, which can also be referred to as a front-side cover element, another cover element, which can also be referred to as a back cover element, an intermediate layer, an active layer and a sealing layer. The first cover element and/or the other cover element can be formed in particular of glass, for instance as glass panel. The intermediate layer can be formed in particular by a laminating film for connecting the first cover element and the other cover element and for embedding the active layer. The laminating film may consist, e.g., of EVA (ethylene vinyl acetate) or PVB (polyvinyl butyral) or polyolefins. The sealing layer may be in particular a butyl layer, which is arranged especially in an edge area of the volume enclosed between the first cover element and the other cover element. The active layer is used to convert light into electrical energy and may comprise or form at least one solar cell. For a lamination the membrane-side surface may be either an outer surface of the first cover element or the other cover element. The at least one force distributing element can be used to distribute a lamination force to at least one portion of the membrane-side surface.

In particular, the at least one force distributing element can be arranged or designed in or on the laminating device in such a way that at least a part of the lamination force, which is transferred or exerted by the membrane element onto at least one section of an edge area of the membrane-side surface, can be distributed by the at least one force distributing element to the at least one portion, preferably only or exclusively to a portion, of the membrane-side surface of the lamination object, in particular the module composite. The portion of the membrane-side surface may in particular be greater than the edge area. More particularly, the portion may comprise the edge area, especially in its entirety. Furthermore the portion may be smaller than the entire membrane-side surface of the lamination object. Thus, it is not necessary that the force distributing element covers the entire membrane-side surface of the lamination object. The edge area may designate here an area extending from the edge to the center of the membrane-side surface. The edge area may have a predefined width, which is smaller than the width or length of the membrane-side surface. For instance, the width of the edge area may be 5%, 10% or 20% of the width or length of the membrane-side surface.

More particularly, the at least one force distributing element can be designed and/or arranged such that at least part of a lamination force, which is transferred or exerted by portions of the membrane, which are arranged in a common plane of projection adjacent to a lateral edge of the lamination object, to an edge area, especially to one edge, of the lamination object, can be distributed to the at least one portion of the membrane-side surface. In this case, the common plane of projection may be oriented perpendicular to a direction of lamination, wherein the direction of lamination may be oriented perpendicular to the surface area of the lamination chamber and/or perpendicular to the membrane-side surface of the lamination object.

The force distributing element may have a predetermined bending stiffness, in particular a high bending stiffness. The force distributing element may be formed, e.g., in part of aluminum or steel.

The laminating apparatus may be in particular a device for producing at least a photovoltaic module.

According to the invention, the at least one force distributing element is mounted to the laminating apparatus, in particular at least to one part of the laminating apparatus. This may mean that the at least one force distributing element is fastened directly or indirectly by mechanical means, for example, via one or more fastening elements, to a part of the laminating apparatus. The mechanical connection may be in particular a force-locking and/or form-locking and/or substance-to-substance connection. Preferably, the mechanical connection is a detachable connection. For instance, the at least one force distributing element may be mounted to the membrane element. Preferably, the force distributing element may be mounted to an immovably arranged part of the laminating apparatus, e.g., to a lamination stretching frame. The lamination stretching frame refers in this case to a part of the laminating apparatus, to which the membrane element is fastened. For example, the membrane element may be gripped or clamped in the lamination stretching frame.

More particularly the at least one force distributing element may be mounted in a movable manner with respect to a stationary arranged part of the laminating apparatus. In particular, the at least one force distributing element may be mounted in a movable manner such that it can move together with the membrane element. This means that a predetermined movement of the membrane element also leads to a movement of the at least one force distributing element. However, it is not mandatory that every movement of the membrane element also leads to moving the force distributing element.

The proposed laminating apparatus results in an advantageous manner that a lamination force transmitted through the membrane element is distributed especially in edge areas of the lamination object improved over at least a portion of the surface of lamination object, whereby a delamination is avoided or decreased and less bubbles are in the lamination object after the lamination process, especially in the previously described edge areas. This was also indicated by correspondingly performed tests.

At the same time, the production process was simplified, since it is not necessary due to the proposed mounting of the force distributing element to the laminating apparatus to apply a panel on the membrane-side surface in a separate step prior to the lamination process.

In another embodiment, the laminating apparatus comprises at least one retaining element for holding the at least one force distributing element. In this case, the retaining element can be used for holding the force distributing element with a predetermined orientation or with an orientation from a predetermined orientation range and/or at a predetermined position or at a position from a predetermined position range in relation to a lamination object arranged in the lamination chamber. The at least one retaining element can be fastened in particular to the laminating apparatus, in particular to the immovable part.

The at least one retaining element can be designed as fastening element or comprise at least one such element, which allows for a direct or indirect fastening of the force distributing element to the laminating apparatus, especially to the immovable part of the laminating apparatus. For instance, the at least one force distributing element can be fastened to the retaining element, wherein the retaining element is fastened to the laminating apparatus. In this case, the fastening can be in particular a detachable fastening. Therefore, the at least one force distributing element can be mounted to a predetermined position or in a predetermined position range in relation to the laminating apparatus and/or with a predetermined orientation in relation to the laminating apparatus. The at least one retaining element can be designed here as a separate component, especially different from the membrane element.

The retaining element allows in an advantageous manner for the structural integration of the at least one force distributing element into the laminating apparatus at a predetermined position or in a predetermined position range in the lamination chamber and/or with a predetermined orientation. In particular, an existing laminating apparatus can be retrofitted with the aid of the at least one retaining element with the at least one force distributing element.

In a further embodiment the retaining element is fastened to a lamination stretching frame. In addition to the at least one retaining element, the membrane element can also be fastened to the lamination stretching frame.

This enables the simplest possible mechanical integration of the force distributing element into a laminating apparatus, especially one already existing.

In a preferred embodiment the retaining element is designed as a web. The web may comprise a predetermined mesh size, for instance, a mesh width of 4 mm. Here it can be assumed that a small mesh size allows for a more accurate positioning of a force distributing element and increases at the same time a stability of the retaining element, whereby a higher retaining force can in turn be provided by the retaining element. Because of this, the at least one force distributing element can be fastened in an advantageous manner to a plurality of positions and/or with a plurality of orientations in relation to the retaining element to such. The fastening can be implemented here, e.g., with the aid of a suitable fastening element, in particular a thread or a wire, by means of which the web and the at least one force distributing element can be fastened to one another mechanically. Consequently, a detachable fastening is thus also possible with the aid of the retaining element designed as web. In particular, the retaining element can be designed as aramid web.

In a further preferred embodiment, the force distributing element comprises a panel-shaped section or is shaped in an, especially complete, panel form. The at least one force distributing element can, for instance, be mounted especially via the at least one retaining element in such a way that a surface of the panel-shaped section can be oriented parallel to a surface area of the laminating chamber or parallel to a membrane-side surface of the lamination object. In this case, the force distributing element may be mounted such that at least a part of the panel-shaped section is arranged over the previously described edge area of the lamination object. The at least partly panel-shaped construction of the force distributing element advantageously results in a preferably uniform distribution of force on a portion of the membrane-side surface of the lamination object.

The surface of the panel-shaped section may have in this case predetermined dimensions, in particular the surface may be smaller than a membrane-side surface of the lamination object. Here a surface may have, e.g., a length and width in the range of few centimeters up to a length and/or width of a surface of the lamination object. In particular, a surface may have a length of 0.2 m and a width of 0.3 m or a length of 0.3 m and a width of 0.3 m.

In another embodiment, the force distributing element comprises at least one support segment for supporting on a surface area of the lamination chamber. Therefore the support segment may come in mechanical contact with the surface area of the lamination chamber. This enables in an advantageous manner that another part of the previously described lamination force may be guided to the surface area and thus, e.g., to a frame or foundation of the laminating apparatus. The at least one support segment may, e.g., have a height in the direction of lamination, which corresponds to a desired height of the laminate, in other words, the lamination object following lamination.

In another embodiment, the force distributing element is designed with a panel shape, wherein a surface of the panel-shaped force distributing element has or forms in a portion of the surface a raised area, in particular an area raised in the direction of lamination. A raised area may designate here an area that overhangs or protrudes from a surface area. The surface area may comprise at least one part, in particular a flat part, of the surface of the panel-shaped force distributing element. The raised area can form in this regard the previously described support segment or support bar. The raised area may be arranged in this case, in particular on the bottom of the force distributing element, in other words a side of the force distributing element facing the membrane-side surface of the lamination object.

The support segment or the raised area may be arranged here on a lateral edge of the panel-shaped force distributing element. This may result, for instance, in an angled profile of the force distributing element. In other words, the force distributing element may be given an L shape in a cross-section, wherein a leg of the L-shaped cross-section is formed from a panel-shaped section of the force distributing element and the other leg from the support segment or the raised area.

It is, however, conceivable that the support segment or the at least one raised area is arranged at a predetermined position and/or with a predetermined orientation in an inner area of the surface of the panel-shaped section, wherein the inner area is surrounded by edge areas of the panel-shaped section.

All in all, this results in the advantage that the previously described lamination force is partly distributed to the membrane-side surface of the lamination object and guided partly to the surface area. This allows for a further reduction of the deformation especially of edge areas of the lamination object during lamination, which in turn further reduces the risk of a bubble formation in the lamination object or laminate.

Furthermore, a surface of the force distributing element, in particular a surface facing the membrane-side surface of the lamination object, may be provided with a predetermined hardness, wherein the hardness of the surface of the force distributing element may be lesser than a hardness of the membrane-side surface of the lamination object. In particular, the surface of the force distributing element may be coated with a predetermined material, for instance, felt. The coating may be implemented in this case using suitable processes, for instance, by bonding or vapor coating. Furthermore, the surface may comprise a predetermined roughness, in particular a roughness, which does not lead to the scratching of the membrane-side surface of the lamination object.

In another embodiment, the laminating apparatus comprises a plurality of force distributing elements that are mounted in each case to the laminating apparatus. Each force distributing element is arranged between the at least one membrane element and a surface area of the lamination chamber. In addition, the lamination force, which is transferred by the membrane element, is distributable via every force distributing element to at least a portion of a membrane-side surface of one or more lamination objects that are arrange able in the lamination chamber. For instance, it is possible that a lamination force is distributable via a force distributing element to to a portion of a membrane-side surface of a first lamination object and to a portion of a membrane-side surface of another lamination object. Consequently, the lamination force may be distributable by the at least one force distributing element to one or more, in particular up to four or even more than four, lamination objects.

The different force distributing elements may each be arranged and/or designed in this case such that the lamination force exerted respectively to edge areas of the lamination objects is distributable to a portion of a membrane-side surface of just one lamination object or to portions of membrane-side surfaces of a plurality of lamination objects, wherein the respective portions may each be larger than the edge area(s) of the lamination object(s) and may comprise these. Therefore, the lamination forces acting on the edge areas may in particular be distributed to a surface of a lamination object or surfaces of a plurality of lamination objects.

This enables in an advantageous manner the lamination of one or more module composite(s), in particular of up to nine module composites in order to produce one or more photovoltaic module(s) in one lamination step. In this context, a force distributing element may simultaneously cover one or two, in particular adjacent, edge area(s) of a module composite. The force distributing element may also cover at the same time two edge areas of two different, in particular adjacent, module composites. The force distributing element may also cover at the same time one or two or more edge areas of up to four module composites. This means that the at least one force distributing element may be arranged in the direction of lamination above the corresponding edge area(s) of the lamination object(s).

In this case, force distributing elements arranged on the outer edge of an arrangement of a plurality of lamination objects may each comprise at least one support segment and may be given, for instance, an L shape in cross-section. Force distributing elements arranged in an inner area of the arrangement of a plurality of lamination objects may have in this case a panel-shaped design.

This enables in an advantageous manner the production of a plurality of photovoltaic modules in a lamination process, wherein for every photovoltaic module the risk of a bubble formation in the lamination module is decreased due to an increased lamination force in the area of edge sections.

Moreover a method for producing at least one laminate, in particular a photovoltaic module, is proposed.

In a first step, at least one lamination object is arranged in a laminating apparatus, in particular in a lamination chamber of the laminating apparatus. The lamination chamber may be designed or provided, for instance, under a membrane element of the laminating apparatus.

The laminating apparatus comprises at least one force distributing element, wherein a lamination force, which is transferrable or exertable by the membrane element to a membrane-side surface of the lamination object, is distributable to at least one portion of the membrane-side surface via the at least one force distributing element.

Moreover, the at least one force distributing element may be mounted to the laminating apparatus. As previously described, the portion of the membrane-side surface may be larger than an edge area of the membrane-side surface. Moreover, the portion may comprise the edge area.

In another step, a predetermined pressure is provided to the membrane element. In this case, the previously described lamination chamber may be evacuated, e.g., and/or a predetermined pressure is generated on the side of the membrane element facing away from the lamination chamber. Due to the pressure exerted on the membrane element, the membrane element may transfer or exert a force on the membrane-side surface. Alternatively or cumulatively a predetermined temperature is provided.

During the provision of the predetermined pressure, at least part of a lamination force, which is transferred or applied by the membrane element to a membrane-side surface, especially to an edge area of the surface, is distributed by the at least one force distributing element to at least a portion of the membrane-side surface of the at least one lamination object.

In particular, at least a part of the lamination force may be distributed exclusively to a portion, but not to the entire membrane-side surface of the at least one lamination object.

The laminating apparatus here may be in particular a laminating apparatus according to one of the previously described embodiments. In this case, the proposed method is implementable in other words with the aid of a laminating apparatus according to one of the previously described embodiments.

The lamination object may be preferably a previously described module composite.

This results advantageously in a method that reduces a number of bubbles embedded in the laminate, especially in the laminated photovoltaic module, in particular bubbles embedded in edge areas.

In another embodiment, the lamination force, in particular another part of the lamination force, is also or additionally transferred by the force distributing element to a surface area of the laminating apparatus or the lamination chamber. For this purpose, the at least one force distributing element may be arranged and/or designed accordingly.

This causes in an advantageous manner a further reduction of a deformation in the edge area of the lamination object, thereby additionally minimizing the risk of bubbles forming or a peeling of a sealing mass in the edge area.

Moreover a method for producing a laminating apparatus is described, wherein a laminating apparatus is provided at least with a membrane element. Furthermore, at least one force distributing element is provided.

Moreover, the at least one force distributing element is mounted to the laminating apparatus. To this end, at least one retaining element may be provided especially for holding the force distributing element. The retaining element may be fastened to the laminating apparatus, in particular a lamination stretching frame.

Here, the at least one force distributing element is mounted such that a lamination force, which is transferred by the membrane element, is distributable via the at least one force distributing element to at least one portion of a membrane-side surface of a lamination object that is arrangeable in the lamination chamber. For instance, the at least one force distributing element can be arranged between the at least one membrane element and a surface area of the lamination chamber.

This results advantageously in a method for producing a laminating apparatus according to one of the previously described embodiments. Consequently the described method for producing a laminating apparatus comprises all steps that are necessary for provided a laminating apparatus according to one of the previously described embodiments.

BRIEF DESCRIPTION OF THE SEVERAL VIEWS OF THE DRAWING

The invention is further explained by way of reference to several embodiments. The figures show.

DESCRIPTION OF THE INVENTION

Figure 1:
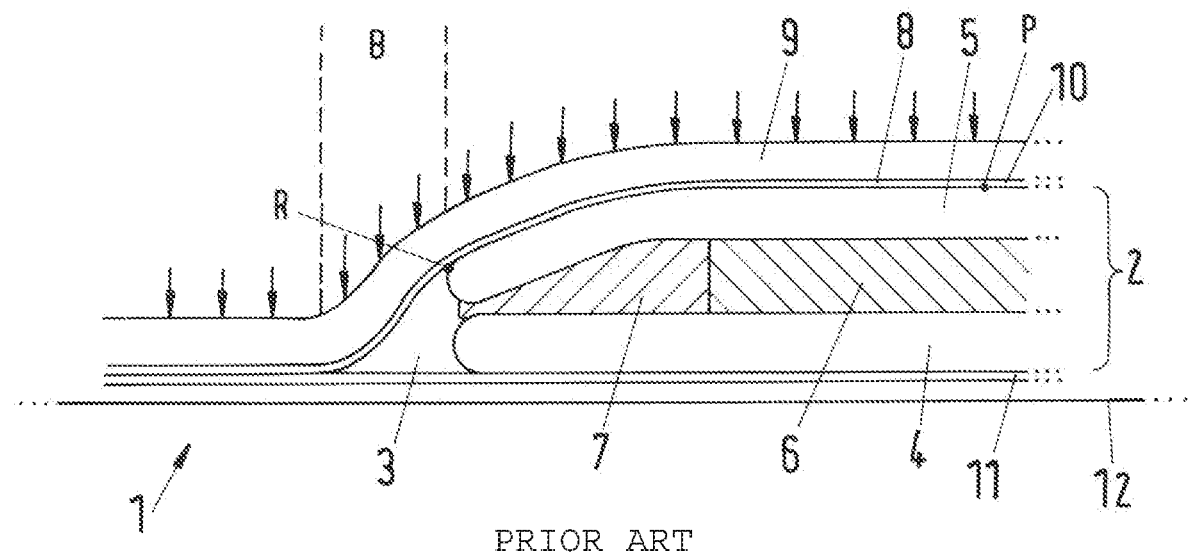
FIG. 1 a schematic cross-section of a laminating apparatus according to the prior art, FIG. 2 a schematic cross-section of a photovoltaic module produced with edge fold pressing, FIG. 3 a schematic cross-section of a laminating apparatus according to the present invention, FIG. 4 a schematic cross-section of a laminating apparatus according to the present invention in a further embodiment, FIG. 5 a top view of a laminating apparatus according to the present invention with a plurality of module composites, FIG. 6a a panel-shaped force distributing element in a first embodiment and FIG. 6b a panel-shaped force distributing element in a further embodiment.

FIG. 1 illustrates a schematic cross-section of a laminating apparatus 1 according to the prior art. A module composite 2 is introduced as a lamination object into a lamination chamber 3 of the laminating apparatus 1. The module composite 2 comprises a front glass panel 4 and a back glass panel 5, which may be referred to as substrate glass panel. The front glass panel 4 may be designed, for instance, as single-pane safety glass. Between the glass panels 4, 5 there is an EVA layer 6 arranged, which connects the glass panels 4, 5 in the laminated state. In an edge area of the module composite 2 there is a sealing layer 7, e.g., a butyl layer arranged, which seals the volume enclosed by the glass panels 4, 5 against external influences. Not shown in the figure is an active layer, which is also arranged between the glass panels 4, 5 and forms the individual solar cells.

The figure further shows a conveyor belt 11, on which the module composite 2 is transported into the area of the lamination chamber 3. The conveyor belt 12 may be designed, for instance, as a web coated with polytetrafluoroethylene. Also shown is a surface area 12 of the laminating apparatus 1, which also forms a surface area of the lamination chamber 3.

The laminating apparatus 1 comprises a cover band 8, which may be designed, for instance, as a web coated with polytetrafluoroethylene. Moreover, the laminating apparatus 1 comprises a membrane 9. The cover band 8 is arranged in this case between the membrane 9 and a membrane-side surface 10 of the module composite 2 and may be used as mechanical protection of the membrane-side surface. For a lamination, one side of the membrane 9 facing away from the lamination chamber 3 is exposed to a predetermined pressure such that a desired differential pressure arises between the volumes separated from one another by the membrane, for instance a differential pressure of 800 mbar. The pressure is indicated in this case by arrows pointing in a direction of lamination.

The lamination chamber 3 may be vacuumized here. Furthermore, a predetermined temperature may be provided in the lamination chamber 3. The membrane 9 comprises a predetermined elasticity, wherein the membrane 9 due to elasticity does not adapt precisely to an edge profile of the module composite 2 and thus has an essentially S-shaped profile in the cross-section in an area B, which is adjacent to a lateral edge of the module composite 2. This profile of the membrane exerts on an edge R of the back glass panel 5 a resulting lamination force, which is in particular greater that a lamination force that acts on a point P, which lies in relation to the back glass panel 5 in an inner section of the back glass panel 5.

This causes a deformation of the back glass panel 5, the edge area of which is bent in the direction of lamination toward the front glass panel 4. In this way, the sealing layer 7 in particular is displaced in the edge area of the module composite 2.

Figure 2:
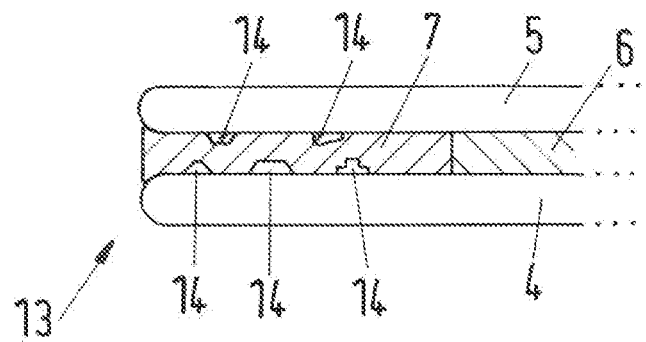

FIG. 2 shows a schematic cross-section of a photovoltaic module 13 produced with edge fold pressing. Following the lamination shown in FIG. 1, the back glass panel 5 tends to return again to an initial non-deformed state, in particular the edge area of the back glass panel 5 moves away again from the front glass panel 4 contrary to the direction of lamination. This causes in particular in the edge area a substantial deformation and expansion of the sealing layer 7. Since the sealing layer 7 counteracts this deformation, internal stresses arise. In this way, the sealing layer 7 may detach at least in some areas of the glass panels 4, 5, especially the front glass panel 4, resulting in formation of bubbles 14 in the photovoltaic module 13.

Figure 3:
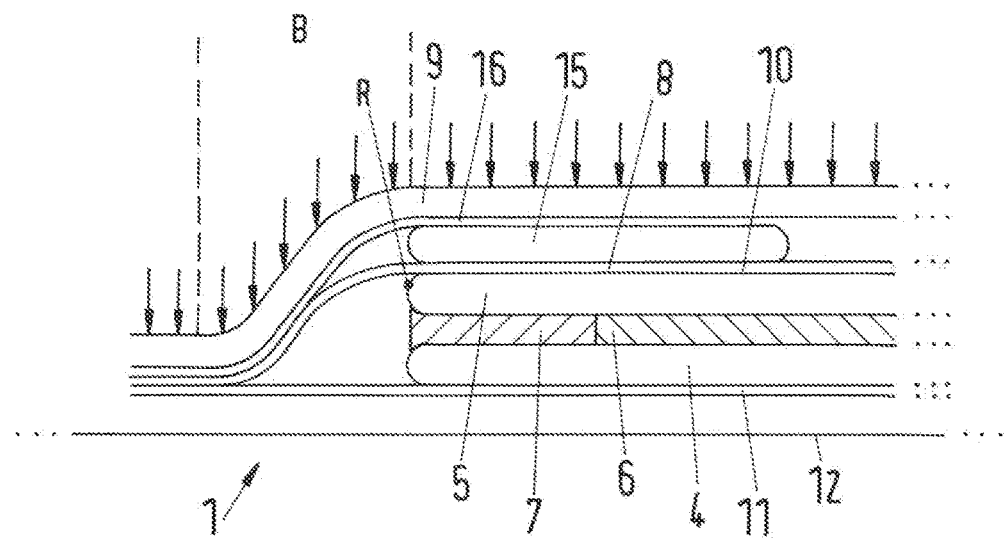

FIG. 3 illustrates a schematic cross-section of a laminating apparatus 1 according to the present invention, In contrast to the embodiment of the laminating apparatus 1 shown in FIG. 1, the laminating apparatus 1 comprises a force distributing element 15 designed as reinforcement plate. The force distributing element 15 is arranged between the membrane 9 and the membrane-side surface 10 of the module composite 2. A support web 16 for holding the force distributing element 15 is also shown. The cover band 8 is also shown. The support web 16 is arranged between the membrane 9 and the force distributing element 15. The cover band 8 is arranged between the force distributing element 15 and the membrane-side surface 10. It is not absolutely necessary, but preferable, however, to provide a cover band 8.

It is also possible that the support web 16 is arranged between the force distributing element 15 and the cover band 8 or the membrane-side surface 10. The cover band 8 may also be designed as or provide a support web 16. If there is no cover band 8 provided, the force distributing element 15, in particular at least one part of a surface of the force distributing element 15, may rest directly on the membrane-side surface 10.

The force distributing element 15 extends here from a lateral edge of the module composite 2 towards a center of the module composite 2, wherein only a portion of the membrane-side surface 10 of the module composite 2 is covered, however, by the force distributing element 15. In particular, the force distributing element may have in this case a width that is less than a width of the module composite 2. A width of the force distributing element may be especially in a range of ⅒ to ⅓ of the width of the lamination object, in other words the module composite 2.

The figure also shows that the force distributing element 15 is arranged flush with the lateral edge of the module composite 2. This is not mandatory, however. In particular, the force distributing element 15 may also extend outwardly by a predetermined amount beyond the lateral edge of the module composite 2 or may be offset inwards with a predetermined offset from the lateral edge of the module composite 2.

The laminating force generated by the pressure on the membrane 9, especially by the laminating force generated by the pressure exerted on the part of the membrane 9 arranged in the area B, which acts on the edge R of the back glass panel 5, is distributed by the force distributing element 15 uniformly to the portion of the membrane-side surface 10 of the module composite 2 which is covered by the force distributing element 15. This prevents or decreases the deformation of the back glass panel 5, especially towards the front glass panel 4, whereby the deformation of the sealing layer 7 is also decreased. Consequently, the risk of bubbles forming as shown in FIG. 2 is reduced.

Figure 4:
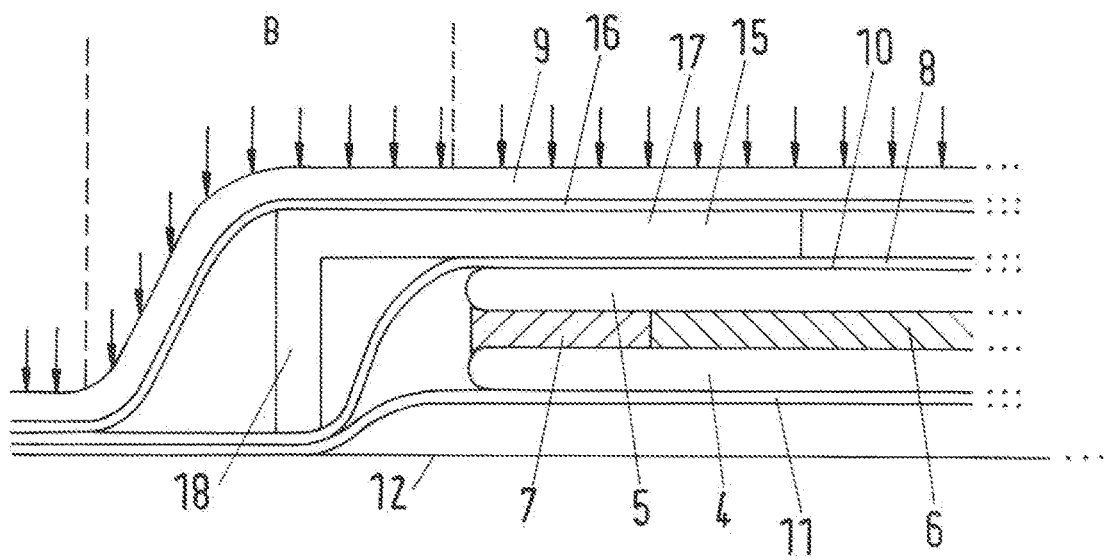

FIG. 4 presents a schematic cross-section of the laminating apparatus 1 according to the present invention in a further embodiment. In contrast to the embodiment presented in FIG. 3, the force distributing element 15 has an L-shape in the cross-section. Thus, the force distributing element 15 comprises a panel-shaped section 17 and a support segment 18. The support segment 18 is used here for supporting on the surface area 12. Consequently, a part of the lamination force transferred over the membrane 9 may be directed via the support segment 18 to the surface area 12, wherein a further portion is distributed via the panel-shaped section 17 to the portion of the membrane-side surface 10 of the module composite 2. FIG. 4 illustrates that the support segment 18 is supported on the cover band 8, the carrier web 16 and the transport belt 11 resting on the surface area 12. The support segment 18 may be arranged in this case with a predetermined distance from a lateral edge of the module composite 2. In this way a run of the cover band 18 and the carrier web is not obstructed in an advantageous manner.

Figure 5:
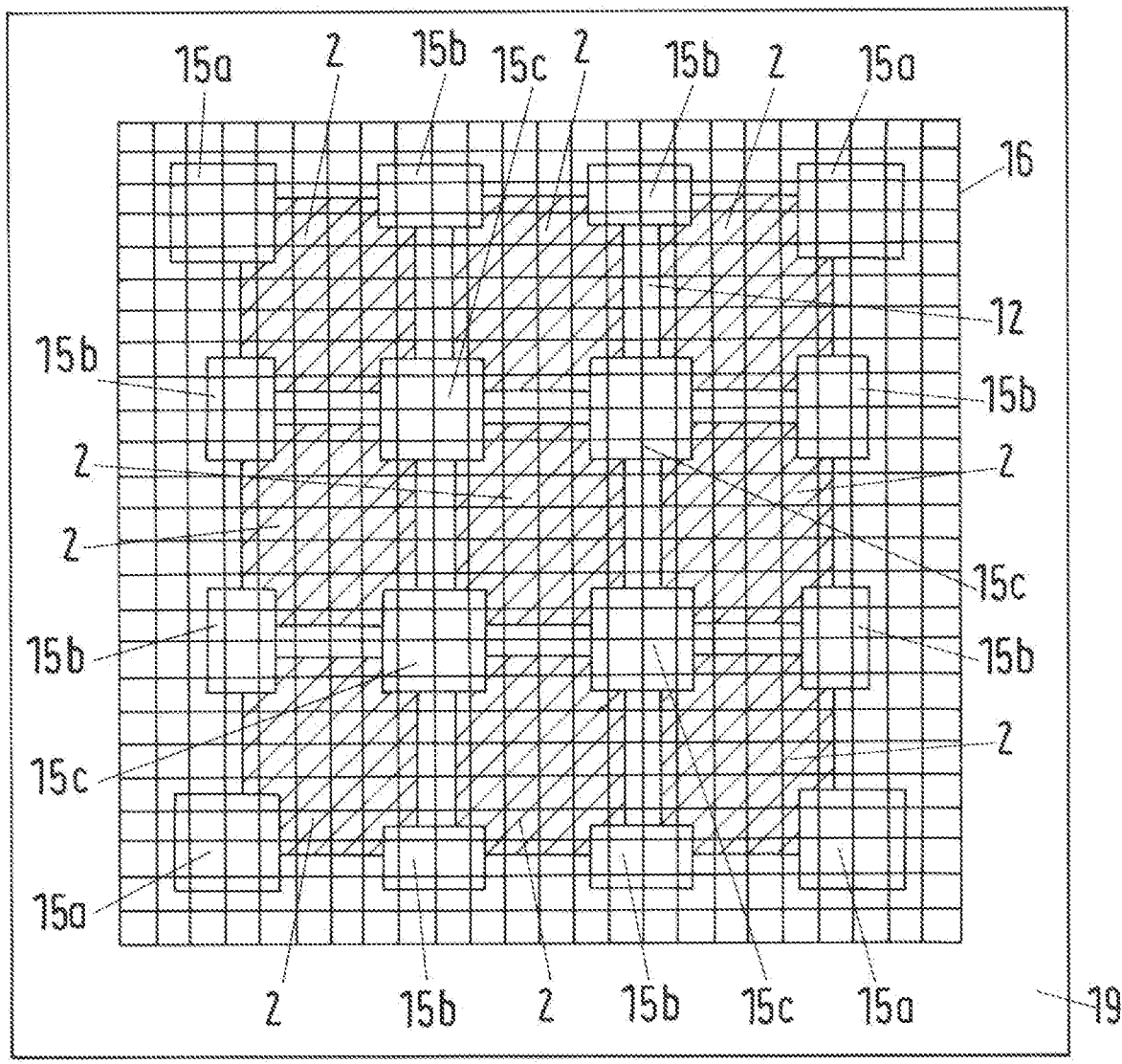

FIG. 5 illustrates a schematic top view of a laminating apparatus 1 according to the present invention. Here it is shown that a plurality, in particular nine, of module composites 2 are arranged in matrix form. In the case presented here, the arrangement comprises three rows with three module composites 2 each. The figure also shows that the module composites 2 are arranged with predetermined distances to one another.

The laminating apparatus 1 comprises a plurality of force distributing elements 15a, 15b, 15c. The force distributing elements 15a, 15b, 15c may vary in this case in their respective construction, e.g. in their dimensions, wherein like reference numerals designate force distributing elements of the same construction.

Force distributing elements 15a according to a first embodiment are arranged and designed here in such a way that at least a part of a lamination force is distributed to one corner area of a surface precisely of one module composite 2 and another part is directed to a surface area 12.

Force distributing elements 15b according to a second embodiment are arranged and designed here in such a way that at least a part of a lamination force is distributed to one corner area of a surface of a first module composite 2 and to a corner area of a surface of a module composite 2 adjacent in a row or column. Another part of the lamination force is directed to the surface area 12.

Force distributing elements 15c according to a third embodiment are arranged and designed here in such a way that at least a part of a lamination force, especially the entire lamination force, is distributed to corner areas of surfaces of four adjacent module composites 2.

The figure also shows a carrier web 16, which has a mesh-like construction. The force distributing elements 15a, 15b, 15c may have perforations, not shown, whereby the force distributing elements 15a, 15b, 15c may be fastened, e.g. sewn, via suitable fastening means, for instance, a wire or a thread, to the carrier web 16. This allows for an easy, in particular detachable, fastening of the force distributing elements 15a, 15b, 15c to a desired position and with a desired orientation on the carrier web 16.

The figure also shows that the carrier web 16 is fastened to an immovable part of the laminating apparatus, namely a lamination stretching frame 19. In this way, the force distributing elements 15a, 15b, 15c are fastened to the laminating apparatus 1.

Figure 6A:
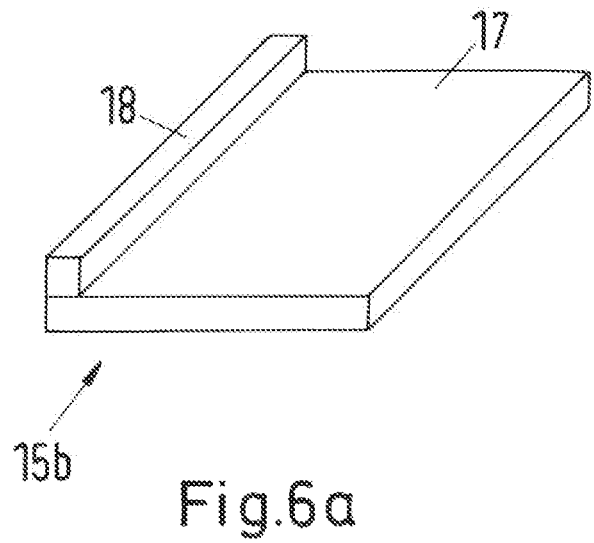

FIG. 6a illustrates a force distributing element 15b according to the previously described second embodiment. The force distributing element 15b comprises a panel-shaped section 17 and a support segment 18. The support segment 18 extends here along one side, in particular a long side, of the panel-shaped section 17. Here the support segment 18 is arranged on the edge of the panel-shaped section 17.

Figure 6B:
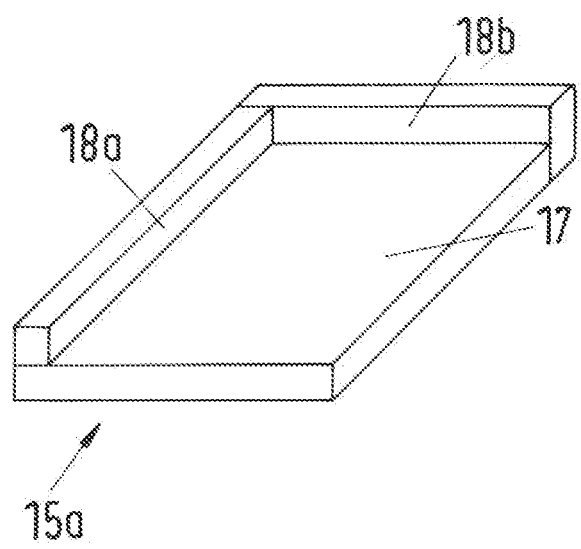

FIG. 6b shows in perspective a force distributing element 15a according to the previously described first embodiment. The force distributing element 15a comprises a panel-shaped section 17, a first support segment 18a and another support segment 18b. The first support segment 18a extends here along a first side of the panel-shaped section 17, wherein the other support segment 18b extends along an adjacent side of the panel-shaped section 17.

The support segments 18, 18a, 18b may be designed, e.g., as support bars. The support segments 18a, 18b may also be arranged at adjacent edges of the panel-shaped section 17.

The force distributing elements 15c, shown in FIG. 5, according to the third embodiment may have in this case exclusively a panel-shaped section 17 and no support segment 18. It is also conceivable, however, that the force distributing elements 15c comprise support segments, which protrude into the intermediate areas, shown in FIG. 5, between adjacent module composites 2, whereby the corresponding force distributing elements 15c may be additionally supported on the surface area 12 as shown in FIG. 5.

FIG. 5 shows that in reference to the arrangement of the module composites 2, force distributing elements 15a, 15b arranged at or over the outer edges of the arrangement have in each case at least one support segment 18, 18a, 18b. The force distributing elements 15c arranged in relation to the arrangement of a plurality of module composites 2 at or over inner edges of the module composites 2 do not necessarily have to exhibit here a support segment 18, 18a, 18b. In this case, force distributing elements 15a, 15b arranged at or over outer edges of the arrangement may have other dimensions than the force distributing elements 15c arranged at or over inner edges of the arrangement. For instance, force distributing elements 15a, 15b arranged at or over outer edges of the arrangement may exhibit dimensions of 0.2 m×0.3 m, while force distributing elements 15c arranged at or over inner edges of the arrangement may exhibit dimensions of 0.3 m×0.3 m. However, force distributing elements 15a arranged at or over outer corners of the arrangement may have even other dimensions than the force distributing elements 15b arranged at or over the remaining outer edge sections, for instance, the same dimensions as the force distributing elements 15c arranged at or over the inner edges of the arrangement.

LIST OF REFERENCE NUMERALS

1 Laminating apparatus
2 Module composite
3 Lamination chamber
4 Front glass panel
5 Back glass panel
6 EVA layer
7 Sealing layer
8 Cover band
9 Membrane
10 Membrane-side surface
11 Transport belt
12 Surface area
13 Photovoltaic module
14 Bubble
15 Force distributing element
15a Force distributing element
15b Force distributing element
15c Force distributing element
16 Carrier web
17 Panel-shaped section
18 Support segment
18a Support segment
18b Support segment
19 Lamination stretching frame
B Area
R Edge
P Point

The invention claimed is:

1. A laminating apparatus, comprising:
at least one membrane member for transferring or exerting a lamination force and having a force-exerting surface;
at least one force-distributing member configured to distribute a lamination force that is transferred or exerted by said at least one membrane member to a portion of a membrane-side surface of a lamination object by said at least one force-distributing member; and
at least one fabric web retaining member for holding said at least one force-distributing member,
wherein said at least one force-distributing member is mounted to the laminating apparatus,
wherein the at least one fabric web retaining member is provided as a member separate from the at least one membrane member, and
wherein the at least one force-distributing member is sized an arranged in or on the laminating apparatus in such a way that at least a part of the lamination force, which is transferred or exerted by the at least one membrane member onto at least one section of an edge area of the membrane-side surface of the lamination object, is distributed by the at least one force-distributing member only to the portion of the membrane-side surface of the lamination object, wherein said portion is smaller than the entire membrane-side surface of the lamination object.

2. The laminating apparatus according to claim 1, which comprises a lamination stretching frame and wherein said at least one fabric web retaining member is fastened to said lamination stretching frame.

3. The laminating apparatus according to claim 1, wherein said at least one force-distributing member comprises a panel-shaped section.

4. The laminating apparatus according to claim 1, wherein said at least one force-distributing member has a panel shape.

5. The laminating apparatus according to claim 1, wherein said at least one force-distributing member comprises at least one support segment for supporting a surface area of the laminating apparatus.

6. The laminating apparatus according to claim 1, wherein said at least one force-distributing member comprises a panel-shaped section or has a panel shape and comprises at least one support segment for supporting a surface area of the laminating apparatus.

7. The laminating apparatus according to claim 1, wherein said at least one force-distributing member has a panel shape, and wherein a surface of said at least one panel-shaped force-distributing member has or forms a raised area in a portion of said surface.

8. The laminating apparatus according to claim 1, wherein said at least one force-distributing member comprises a panel-shaped section or is panel-shaped and wherein a surface of said at least one panel-shaped force-distributing member has or forms a raised area in a portion of said surface.

9. The laminating apparatus according to claim 1, wherein said at least one force-distributing member is one of a plurality of force-distributing members, each mounted to the laminating apparatus.

\* \* \* \* \*